May 16, 1939.  H. F. SCHMIDT  2,158,835

BEARING LUBRICATION

Filed Dec. 22, 1937

INVENTOR
HENRY F. SCHMIDT.
BY
ATTORNEY

Patented May 16, 1939

2,158,835

UNITED STATES PATENT OFFICE 2,158,835

BEARING LUBRICATION

Henry F. Schmidt, Lansdowne, Pa., assignor to Westinghouse Electric & Manufacturing Company, East Pittsburgh, Pa., a corporation of Pennsylvania Application December 22, 1937, Serial No. 181,075

7 Claims. (Cl. 308—121)

My invention relates to journal bearings and it has for an object to provide improved means reliably serving this purpose.

A further object of my invention is to provide a bearing with a pump for supplying lubricant from a lower reservoir to the bearing and with a viscosity pump arrangement which is effective for lubricating the bearing in the event that the journal should be placed in rotation without rendering the pump effective, the viscosity pumping arrangement being self-priming and supplying lubricant from an upper reservoir depending for its supply upon surplus lubricant escaping from the bearing and supplied thereto by the pump.

A further object of my invention is to provide a bearing having lubricating features supplied with lubricant by means of a pump, said features constituting parts of a viscosity pumping arrangement and the pump normally maintaining the arrangement primed so that, in the event of failure of the pump, the arrangement becomes immediately effective to supply lubricant to the bearing.

A further object of my invention is to provide, in connection with a bearing, upper and lower lubricant reservoirs, the upper reservoir being arranged to receive surplus lubricant escaping from the bearing and having a predetermined level of lubricant maintained therein by means of an overflow draining to the lower reservoir, lubricating features normally supplied with lubricant by means of a pump having its intake connected to the lower reservoir and such features embodying essential parts of a viscosity pumping arrangement supplied with lubricant from the upper reservoir, whereby, in the event that the journal of the bearing should be rotated without placing the pump in operation, lubrication of the bearing will be assured.

A further object of my invention is to provide, in connection with a bearing and a journal carried thereby, upper and lower lubricant reservoirs, the upper reservoir receiving surplus lubricant escaping from the bearing and having a predetermined level of lubricant maintained therein by means of an overflow discharging to the lower reservoir and the bearing having lubricating features supplied with lubricant by means of a pump having its intake communicating with the lower reservoir, said features embodying parts of viscosity pumping arrangements effective to supply lubricant to the bearing in the event of failure of the pump or if the journal should be rotated without placing the pump in operation.

These and other objects are effected by my invention as will be apparent from the following description and claims taken in connection with the accompanying drawing forming a part of this application, in which:

Figures 1, 3:
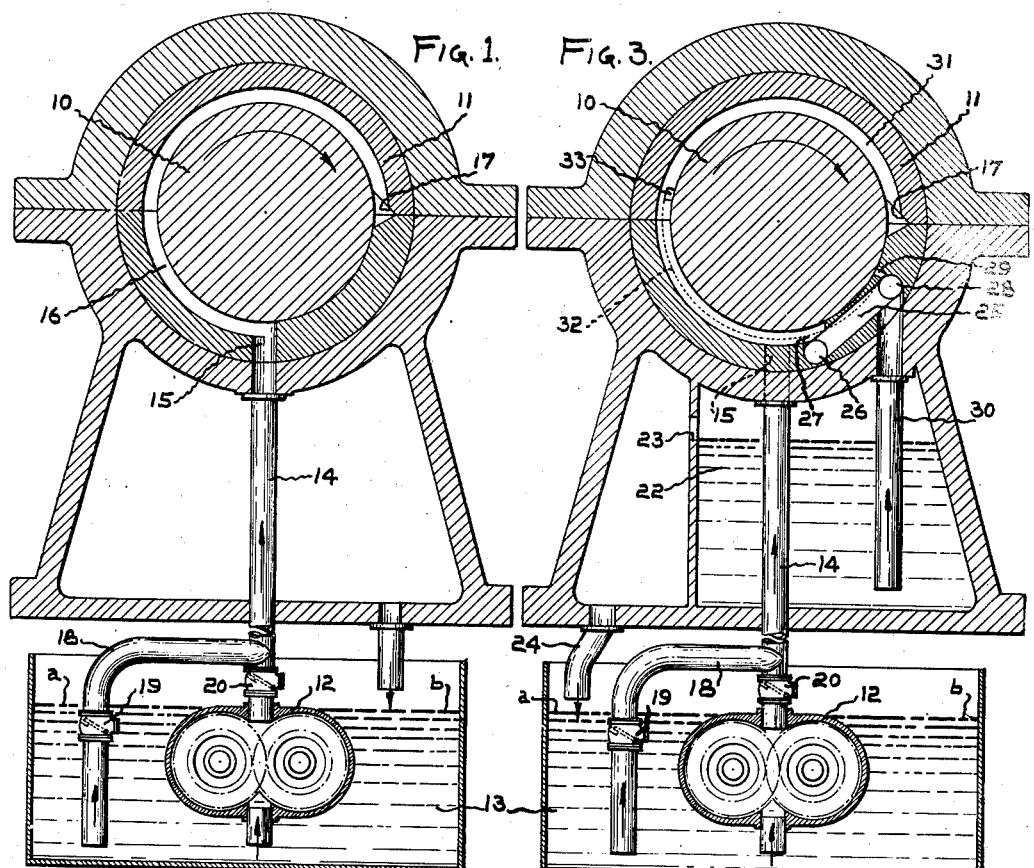
Fig. 1 is a sectional view of a bearing showing one form of my improved lubricating arrangement and taken along a line corresponding to the line I—I of Fig. 2.
Fig. 3 is a sectional view showing a further embodiment of my improved bearing lubricating arrangement and taken along a line corresponding to the line III—III of Fig. 4.
Figure 2:
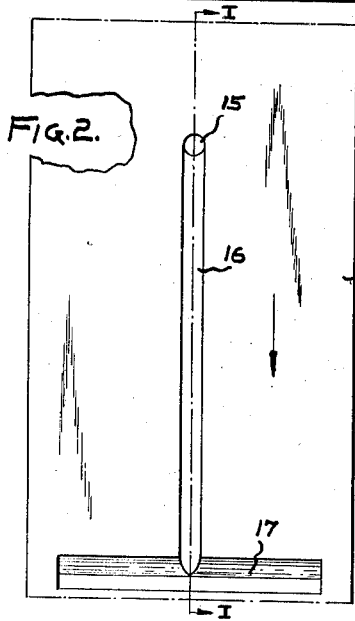
Fig. 2 is a developed view of the interior of the bearing of Fig. 1.

Referring to the drawing more in detail, in Figs. 1 and 2, the journal 10 is carried by a bearing 11 normally supplied with lubricant by a pump 12 having its intake communicating with the reservoir 13 and having its discharge connected by the conduit 14 to the inlet 15 of the bearing.

The interior of the bearing is provided with a viscosity groove or channel 16 communicating with the inlet 15 and extending circumferentially of the bearing in the direction of rotation of the journal 10. The direction of journal rotation is indicated by the arrows on Figs. 2 and 4. Preferably, the end of the groove 16 remote from the inlet 15 communicates with a distributing groove or channel 17 extending longitudinally of the interior of the bearing.

The conduit 14 has connected thereto, between the pump 12 and the bearing inlet 15, a second conduit 18 having its lower end extending into the reservoir 13 and having a check valve 19 opening in the direction of flow toward the bearing.

Normally, the bearing features or channel arrangements including the circumferentially extending and longitudinally extending channel parts 16 and 17, respectively, are supplied with lubricant by means of the pump 12, the check valve 19 closing to prevent discharge of lubricant by the pump through the conduit 18 back into the reservoir, the check valve also serving to maintain the conduits 14 and 18 filled with lubricant to prime the viscosity pump comprised by the journal 10 and the channel arrangement including at least the channel 16 extending from the lubricant inlet 15 circumferentially in the direction of rotation of the journal, whereby, in the event of failure of the pump 12, the viscosity pump becomes immediately effective to supply lubricant from the reservoir 13 to the bearing.

In Fig. 1, an additional check valve 20 is preferably arranged in the conduit 14 between the junction of the conduit 18 therewith and the discharge of the pump 12, such check valve also opening in the direction of flow toward the bearing and serving to further assure of a priming column of lubricant in the conduits 14 and 18 effective to prime the viscosity pump in the event of failure of the pump 12.

The check valve 19 in the conduit 18 is also preferably arranged at an elevation not exceeding the normal level a—b in Fig. 1 of the lubricant in the reservoir 13, with the result that no air pocket forms below the check valve and the conduit 18 is normally completely filled with lubricant to effect a better priming condition of the viscosity pump.

Figure 4:
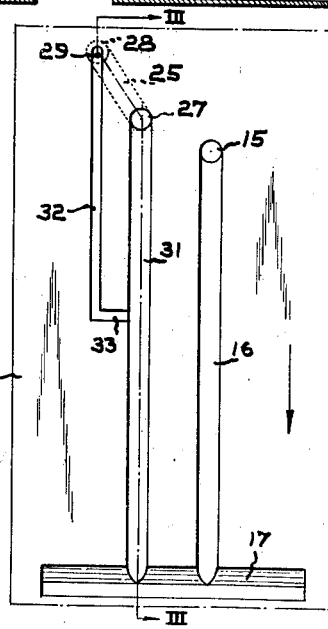
Fig. 4 is a developed view of the interior of the bearing shown in Fig. 3.

In Figs. 3 and 4, the bearing 11 has an upper reservoir 22 arranged therebelow so as to receive surplus lubricant escaping therefrom and a predetermined level of lubricant is maintained in the reservoir by means of an overflow 23 draining, by a conduit 24, to the lower reservoir 13. In these views, the pump 12 not only constitutes the means for normally supplying lubricant to the bearing 11, but it also assures of the maintenance of a predetermined level of lubricant in the upper reservoir 22, the latter being essential as the source of supply for a self-priming viscosity pumping arrangement such as disclosed and claimed in the application of Wilson et al., Serial No. 216,878, filed July 1, 1938, and now to be briefly described.

Said self-priming viscosity pumping arrangement comprises an inclined chamber 25 having its lower portion 26 connected, by means of a port 27 to the interior of the lower portion of the bearing 11 and having at least its upper portion 28 arranged above the lower portion of the bearing and connected to the interior of the latter by means of a vent port or opening 29. A conduit 30 has its upper end communicating with the upper portion 28 of the chamber and its lower end submerged in the upper reservoir 22. If, in Fig. 3, the journal 10 should be rotated in the direction indicated without placing the pump 12 in operation, the supply of lubricant normally maintained in the chamber 25 is effective initially to supply lubricant gravitationally to the inlet 27, air entering the vent permitting of free flow through the port 27, such lubricant entering the channel 31 extending circumferentially from the port 27 in the direction of rotation of the journal 10 and preferably having its end remote from the port 27 also communicating with a longitudinal distributing groove 17 already described. As soon as a film of lubricant is provided in the bearing, that is, as soon as the channel arrangement is primed, the journal and the channel arrangement in the primed condition then becomes effective as a viscosity pump to draw lubricant up the conduit 30 for passage to the upper portion 28 of the inclined chamber and from the latter to the port 27 to the channel arrangement to lubricate the bearing. Upon priming of the apparatus to function as a viscosity pump, the vent 29 should not impair or prevent such operation. Accordingly, the vent 29 communicates with a groove 32, also extending circumferentially in the direction of rotation and communicating with the groove 31 at the junction 33 spaced a sufficient distance circumferentially to prevent the possibility of recirculation of air through the ports 27 and 29 and the chamber breaking the suction effect set up by priming. Instead of the latter undesired operation, while the chamber 28 is vented through the port 29 when the shaft is started, the grooves 31 and 32, permitting of sufficient flow of air for this purpose, just as soon as priming is effected, the suction or entraining effect exerted by oil passing along the groove 31 assures of air being drawn along the passage 32 and mixed with the oil, whereby air will be removed from the port 29 and the upper portion of the chamber 26 in such manner that the latter chamber and the pipe 30 provide a reliable suction passage for the viscosity pump. While the first effect following priming is to withdraw air in this manner, the operation is soon stabilized, the vent 29 and the passage 32 being filled with oil. With stoppage of the shaft, seepage of oil from the grooves permits of the port 29 being rendered effective to vent the upper end of the chamber 26 to provide for priming, as already described.

As surplus lubricant escaping from the bearing drops into the upper reservoir 22, and as the viscosity pumping arrangement just described is supplied from the latter reservoir, such viscosity pumping arrangement would be effective for lubricating the bearing over a prolonged interval of time; however, I prefer to use such viscosity pumping arrangement merely as a safety measure to guard against damage in case the journal 10 should be rotated without placing the pump in operation. In other words, while the pump 12 is relied upon as the primary and adequate source for supplying the bearing 11 with lubricant, nevertheless, the viscosity pumping arrangement, including the inclined chamber 25 and associated features constitutes an emergency or safety measure sufficient to lubricate the bearing to prevent injury should rotation of the journal 10 be started without placing the pump 12 in operation.

In addition to the viscosity pumping arrangement safeguarding the bearing in the event the journal should be placed in operation without starting the pump 12, the latter also has associated therewith the viscosity arrangement such as already described in connection with Figs. 1 and 2, that is, the inlet 15 communicates with a channel arrangement including a channel 16 extending from the inlet 15 in the direction of rotation of the journal 10 and having its end remote from the inlet 15 preferably connected to a channel 17 extending longitudinally of the bearing. Also, the conduit 14 has a conduit 18 joined thereto and having a check valve 19 opening in the direction of flow toward the bearing. Furthermore, the conduit 14 is preferably provided with a check valve opening in the direction of flow toward the bearing and arranged between the junction of the conduit 18 therewith and the discharge of the pump 12. Therefore, while, in Figs. 3 and 4, the pump 12 may serve merely to supply lubricant to the bearing 11 and to maintain a supply of lubricant for the viscosity pumping arrangement including the inclined chamber 25, the latter safeguarding against the possibility of damage to the bearing if the journal should be started without placing the pump in in operation, nevertheless, I prefer also to have associated with the pump 12 the additional viscosity pumping arrangement such as incorporated in Figs. 1 and 2 and which would be effective to maintain an adequate supply of lubricant to the bearing in the event of failure of the pump 12.

Figure 5:
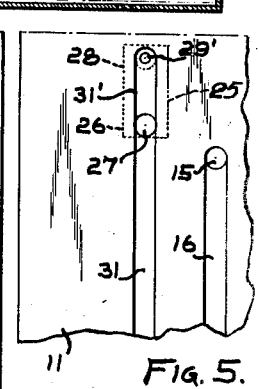
Fig. 5 is a developed view similar to Fig. 4 but showing an alternative vent arrangement.

In Fig. 5, there is shown a modification of the embodiment of Figs. 3 and 4, wherein the groove 31 has an extension 31' extending from the port 27 to the vent 29', this extension 31' taking the place of the passage 32 in Fig. 4.

While I have shown my invention in three forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In combination, a bearing; a journal fitting the bearing; means providing an elongated chamber inclined so that its end portions are at different elevations relative to the bearing with at least the upper end portion above the lower portion of the bearing, with the lower end portion connected by a port to the lower portion of the bearing interior, and with the upper end portion connected by a vent opening to the interior of the bearing; said bearing having a lubricant inlet, a channel arrangement connected to said port and inlet and extending therefrom circumferentially in the direction of rotation of the journal; an upper reservoir disposed immediately below the bearing so as to catch surplus lubricant escaping from the latter; a lower reservoir; an overflow arranged to maintain a predetermined level of lubricant in the upper reservoir and providing drainage therefrom to the lower reservoir; a pump having its intake in communication with the lower reservoir; a conduit connecting the discharge of the pump with said inlet; and a conduit communicating with the upper end portion of the chamber and having its lower end submerged in the lubricant in the upper reservoir.

2. In combination, a bearing; a journal fitting the bearing; means providing an elongated chamber inclined so that its end portions are at different elevations relative to the bearing with at least the upper end portion above the lower portion of the bearing, with the lower end portion connected by a port to the lower portion of the bearing interior, and with the upper end portion connected by vent opening to the interior of the bearing; said bearing having a lubricant inlet, an internal channel arrangement connected to the inlet and the port and extending therefrom in the direction of journal rotation; an upper reservoir disposed immediately below the bearing so as to catch surplus lubricant escaping from the latter; a lower reservoir; an overflow arranged to maintain a predetermined level of lubricant in the upper reservoir and providing drainage therefrom to the lower reservoir; a pump having its intake in communication with the lower reservoir; a first conduit connecting the discharge of the pump with said inlet; a second conduit having one end communicating with the first conduit and its other end with the lower reservoir, a check valve in the second conduit and opening in the direction of flow toward the bearing; and a conduit communicating with the upper end portion of said elongated chamber and having its lower end submerged in the lubricant in the upper reservoir.

3. The combination as claimed in claim 2 wherein the check valve in said second conduit is arranged at an elevation not exceeding the normal oil level in the lower reservoir.

4. The combination as claimed in claim 2 with a check valve in the first conduit between the point of pump discharge and the junction of the second conduit therewith and opening in the direction of flow toward the bearing.

5. In combination, a bearing; a pedestal for the bearing; a journal fitting the bearing, means providing an elongated chamber inclined so that its end portions are at different elevations relative to the bearing with at least the upper end portion above the lower portion of the bearing, with the lower end portion connected by port to the lower portion of the bearing, and with the upper end portion connected by vent opening to the interior of the bearing above the lower portion of the latter; said bearing having a lubricant inlet, first and second channels extending circumferentially in the direction of journal rotation and covered by the journal, the first channel having its inlet end communicating with said inlet and the second channel having its inlet end communicating with said port, and a channel or groove extending longitudinally of the bearing and communicating with the ends of said first and second channels remote from the inlet ends thereof; said pedestal having an upper reservoir disposed so as to catch surplus lubricant escaping from the bearing; a lower reservoir; an overflow arranged to maintain a predetermined level of lubricant in the upper reservoir and providing drainage therefrom to the lower reservoir; a pump having its intake in communication with the lower reservoir; a first conduit connecting the discharge of the pump with said inlet; a second conduit having one end communicating with the first conduit and its other end with the lower reservoir; a check valve in the second conduit and opening in the direction of flow toward the bearing; and a conduit communicating with the upper end portion of said chamber and having its lower end submerged in the lubricant in the upper reservoir.

6. In combination, a journal, a bearing for the journal, said journal and the bearing having features cooperating to provide first and second viscosity pumps for supplying oil to the bearing surfaces, upper and lower oil reservoirs, a conduit for supplying oil from the upper reservoir to the first viscosity pump, means responsive to initiation of rotation of the shaft for priming said first viscosity pump so that the latter may be effective to supply oil from the upper reservoir to the bearing surfaces, a third pump having its inlet in communication with the lower reservoir, a pipe for supplying oil from the third pump to the bearing, said second viscosity pump being in communication with said supply pipe, and means providing a by-pass connection around the third pump and effective in the event of failure of the latter to supply oil from the lower reservoir to the second viscosity pump.

7. In combination, a journal, a bearing for the journal, said journal and the bearing having features cooperating to provide first and second viscosity pumps for supplying oil to the bearing surfaces, upper and lower oil reservoirs, a conduit for supplying oil from the upper reservoir to the first viscosity pump, means responsive to initiation of rotation of the shaft for priming said first viscosity pump and including a reservoir provided in said conduit and arranged for gravitational flow of oil to the bearing, a third pump having its inlet in communication with the lower reservoir, a pipe for supplying oil from the third pump to the bearing, said second viscosity pump being in communication with said pipe, means providing a by-pass connection around the third pump and effective in the event of failure of the latter to supply oil from the lower reservoir through the pipe to the second viscosity pump, and means providing for surplus lubricant escaping from the bearing draining into the upper reservoir and from the latter into the lower reservoir.

HENRY F. SCHMIDT.